United States Patent
Peetz et al.

(10) Patent No.: US 9,089,004 B2
(45) Date of Patent: *Jul. 21, 2015

(54) NETWORK WITH SUBNETS BEING CONNECTABLE VIA BRIDGE TERMINALS

(75) Inventors: Jörg Peetz, Ludwigsburg (DE); Yusuf Efe, Aldenhoven (DE); Jörg Habetha, Aachen (DE); Klaus Peter May, Aachen (DE); Olaf Wischhusen, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 974 days.

This patent is subject to a terminal disclaimer.

(21) Appl. No.: 10/552,228

(22) PCT Filed: Apr. 1, 2004

(86) PCT No.: PCT/IB2004/050379
§ 371 (c)(1),
(2), (4) Date: Oct. 6, 2005

(87) PCT Pub. No.: WO2004/091145
PCT Pub. Date: Oct. 21, 2004

(65) Prior Publication Data
US 2006/0215619 A1 Sep. 28, 2006

(30) Foreign Application Priority Data
Apr. 9, 2003 (EP) .................................. 03100957

(51) Int. Cl.
*H04W 52/02* (2009.01)
*H04W 92/02* (2009.01)
*H04W 88/16* (2009.01)

(52) U.S. Cl.
CPC .......... *H04W 92/02* (2013.01); *H04W 52/0216* (2013.01); *H04W 52/0219* (2013.01); *H04W 52/0222* (2013.01); *H04W 88/16* (2013.01); *Y02B 60/50* (2013.01)

(58) Field of Classification Search
USPC .................. 370/328, 335, 341, 431, 445, 447
See application file for complete search history.

(56) References Cited

U.S. PATENT DOCUMENTS

| 5,572,528 A | 11/1996 | Shuen |
| 5,654,959 A * | 8/1997 | Baker et al. .................... 370/331 |

(Continued)

FOREIGN PATENT DOCUMENTS

| DE | 101 07 816 A1 | 9/2002 |
| EP | 0996257 A2 | 4/2000 |

(Continued)

OTHER PUBLICATIONS

Simon Baatz, et al: Bluetooth Scattemets: An Enhanced Adaptive Scheduling Scheme, IEEE Infocom Jun. 2002, vol. 1 of 3, No. 21, pp. 782-790, XP010593640.

(Continued)

*Primary Examiner* — Rasheed Gidado
(74) *Attorney, Agent, or Firm* — Larry Liberchuk

(57) ABSTRACT

The present invention relates to the connection of subnets which operate on different frequency channels and are connected by wireless forwarder stations. According to the present invention, a forwarding station periodically switches to the other frequency channel to remain there for a predefined presence duration, whereby jitters of the presence time caused by overlapping packet transmissions are compensated. According to the present invention, a presence and absence time of the forwarder station in the respective subnet is indicated by using signals relating to a power saving mechanism.

15 Claims, 6 Drawing Sheets

(56) References Cited

U.S. PATENT DOCUMENTS

| | | | |
|---|---|---|---|
| 6,018,642 A * | 1/2000 | Adachi | 340/7.33 |
| 6,104,937 A * | 8/2000 | Fujimoto | 455/574 |
| 6,198,728 B1 * | 3/2001 | Hulyalkar et al. | 370/310.1 |
| 6,259,898 B1 * | 7/2001 | Lewis | 455/103 |
| 6,556,576 B1 * | 4/2003 | Du et al. | 370/401 |
| 6,665,520 B2 * | 12/2003 | Romans | 455/13.4 |
| 6,771,985 B1 * | 8/2004 | Iinuma | 455/561 |
| 6,791,997 B2 * | 9/2004 | Beyer et al. | 370/447 |
| 6,816,502 B2 * | 11/2004 | Ekl et al. | 370/447 |
| 7,027,462 B2 * | 4/2006 | Benveniste | 370/447 |
| 7,079,508 B2 * | 7/2006 | Ayyagari et al. | 370/329 |
| 7,158,778 B2 * | 1/2007 | Sameer et al. | 455/412.2 |
| 7,184,449 B2 * | 2/2007 | Spalink | 370/508 |
| 7,218,944 B2 * | 5/2007 | Cromer et al. | 455/515 |
| 7,324,486 B2 * | 1/2008 | Noguchi et al. | 370/336 |
| 7,412,265 B2 * | 8/2008 | Chen et al. | 455/574 |
| 7,457,298 B2 * | 11/2008 | Du et al. | 370/401 |
| 2002/0181459 A1 * | 12/2002 | Ohta et al. | 370/389 |
| 2003/0103472 A1 * | 6/2003 | Taylor et al. | 370/318 |
| 2003/0125087 A1 * | 7/2003 | Shimizu | 455/561 |
| 2004/0004951 A1 * | 1/2004 | Zuniga et al. | 370/338 |
| 2004/0136318 A1 * | 7/2004 | Bentley | 370/221 |
| 2004/0184475 A1 * | 9/2004 | Meier | 370/449 |
| 2004/0196812 A1 * | 10/2004 | Barber | 370/334 |
| 2005/0154933 A1 * | 7/2005 | Hsu et al. | 713/320 |
| 2005/0157745 A1 * | 7/2005 | Fujii et al. | 370/449 |
| 2005/0190709 A1 * | 9/2005 | Ferchland et al. | 370/311 |

FOREIGN PATENT DOCUMENTS

| | | |
|---|---|---|
| EP | 1009141 A1 | 6/2000 |
| EP | 1009141 B1 | 6/2000 |
| EP | 1011241 A1 | 6/2000 |
| EP | 1011243 A1 | 6/2000 |
| WO | 02091685 A2 | 11/2002 |

OTHER PUBLICATIONS

Part 11: Wireless LAN Medium Access Control (MAC) and Physical Layer (PHY) Specifications, IEEE Jul. 1997, pp. 123-137, XP002304615.

* cited by examiner

NETWORK WITH SUBNETS BEING CONNECTABLE VIA BRIDGE TERMINALS

The present invention relates to the field of packet switching networks. In particular, the present invention relates to a method of connecting a first subnet and a second subnet of a communication network by means of a bridge terminal, to a bridge terminal, to a communication network with a first subnet and a second subnet and a bridge terminal for connecting the first and second subnets and to a computer program for operating a bridge terminal of a communication network for connecting a first subnet and a second subnet.

Radio networks of the standards and types, for example W-CHAMB, ETSI BRAN Hiper-LAN/2, HomeRF, DECT, Bluetooth/IEEE 802.15 and IEEE 802.11 are developed for the operation in unlicensed bands. In general, those radio networks share radio resources.

Document "Broadband Radio Access Networks (BRAN), HIPERLAN type 2; "Functional Specifications; Data Link Control (DLC) Layer; Part 4: Extension for Home Environment", DTS 101 761-4, ETSI, April 2000." describes an ad hoc network including a plurality of terminals. At least one terminal is provided as controller for controlling the ad hoc network. In some cases, it may be necessary that another terminal becomes the controller of the ad hoc network. In case such a network reaches a pre-determined size, the division of the ad hoc network into sub-networks is required. For performing and controlling the communication between the subnets, there may be provided a terminal which is adapted as bridge terminal. Such a bridge terminal, which may also be referred to as "forwarder" is, for example, described in DE 101 07 816 A1.

It is an object of the present invention to allow for a simple and reliable communication between the subnets of a communication network.

According to an exemplary embodiment of the present invention, the above object may be solved with a method of connecting a first subnet and a second subnet of a communication network by means of a bridge terminal wherein the first subnet operates on a first frequency channel and the second subnet operates on a second frequency channel. According to an exemplary embodiment of the present invention, an operation of the bridge terminal is switched between an operation in the first subnet on the first frequency channel and an operation in the second subnet on the second frequency channel. When the bridge terminal is operated in the first subnet it is unavailable for the second subnet. When the bridge terminal is operated in the second subnet, it is unavailable for the first subnet. The unavailability of the bridge terminal in the first and the second subnets is signaled to terminals of the first and second subnets by means of a power saving signal of the communication network.

According to this exemplary embodiment of the present invention, a very simple method is provided for controlling the bridge terminal in a way that during its absence time in the first and second subnets, no information gets lost, while allowing for a high data transmission rate.

According to an exemplary embodiment of the present invention, the communication network is a packet transmission or switching network in accordance with the IEEE 802.11 standard. The IEEE 802.11 standard (IEEE 801.11, 1999 edition (ISO/IIC 8802-11: 1999) IEEE standards for information technology-telecommunications and information exchange between systems) is hereby incorporated by reference.

According to another exemplary embodiment of the present invention, the bridge terminal is switched periodically between the first and second subnets and jitters in a pre-determined duration of absence in the subnets are compensated over a plurality of switching cycles by respectively controlling the switching.

Advantageously, this exemplary embodiment of the present invention may ensure that the presence time of the bridge terminal is equal for both subnets. Advantageously, this avoids delays in the data transmission.

According to another exemplary embodiment of the present invention, a content of missed beacon signals is reported by the bridge terminal by means of a probe/probe signaling. Advantageously, this allows for a very secure data transmission.

Another exemplary embodiment of the present invention provides for a bridge terminal for connecting the first and second subnets, where the unavailability of the bridge terminal in the first and second subnets, i.e. the absence and presence time in the respective one of the first and second subnets is signaled within the respective subnets by means of a power saving signal of the communication network. Advantageously, according to this exemplary embodiment of the present invention, a simple connection between subnets of a communication network is provided, where an already existing signal structure, namely the signals relating to a power saving mode are used for signaling the absence time and the presence time of the bridge circuit in the respective subnet.

Further exemplary embodiments of the bridge terminal according to the present invention, which may allow for an improved data transmission rate between the subnets, while requiring no further signaling structure for informing other terminals in the first and second subnets about the absence time and the presence time of the bridge terminal.

Additional exemplary embodiments of communication networks according to the present invention allow for a simple network architecture, which can be set up with low effort and at low cost.

The present invention also relates to a computer program for operating a bridge terminal of a communication network for connecting a first subnet and a second subnet, wherein the first subnet operates on a first frequency channel and the second subnet operates on a second frequency channel. The computer program according to the present invention is preferably loaded into a working memory of a data processor in the bridge circuit. The data processor in the bridge circuit is thus equipped to carry out the method of the invention. The computer program may be stored on a computer readable medium, such as a CD-Rom. The computer program may also be presented over a network, such as the WorldWideWeb and can be downloaded into the working memory of a data processor from such a network.

It may be seen as the gist of an exemplary embodiment of the present invention that the bridge circuit or forwarding station switches to the other frequency channel of the other subnet, to remain there for a pre-defined presence duration. According to an exemplary embodiment of the present invention, jitters of the presence time caused by overlapping packet transmission are compensated. According to an aspect of the present invention, the presence and absence of the bridge circuit in the respective subnets is signaled in the respective subnets to, for example, other terminals by using signals relating to the power saving mode of the communication network.

These and other aspects of the present invention are apparent and will be elucidated with reference to the embodiments described hereinafter and with reference to the following drawings.

Figure 1:
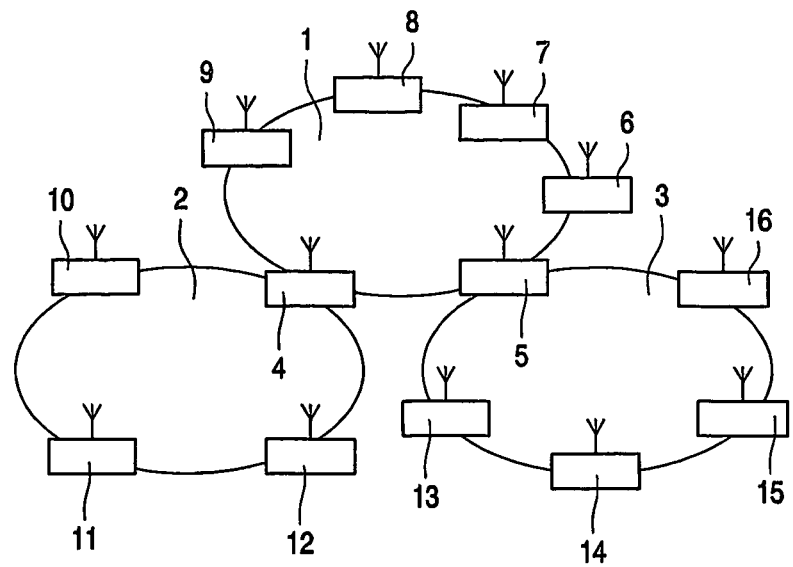
FIG. 1 shows a simplified schematic representation of an ad hoc network, including three subnets, each subnet including terminals for radio transmission according to an exemplary embodiment of the present invention.

FIG. 1 shows a simplified schematic representation of an exemplary embodiment of an ad hoc communication network in accordance with the present invention. The network depicted in FIG. 1 includes three subnets 1 to 3, respectively including a plurality of terminals 4 to 16. The terminals 4 to 9 are part of the subnets 1, terminals 4 and 10 to 12 are part of the subnet 2 and terminals 5 and 13 to 16 are part of the subnet 3. Within a subnet, the terminals belonging to the respective subnet exchange data via radio transmission. The ellipses depicted in FIG. 1 respectively indicate the radio areas of the subnets 1 to 3 within which a communication between terminals belonging to the respective subnet is possible.

Terminals 4 and 5 are referred to as bridge terminals or forwarders since these terminals allow for a data transmission between the subnets 1 and 2 and 1 and 3. The bridge terminal 4 is provided for the data transmission between the subnets 1 and 2 and the bridge terminal 5 is provided for the data transmission between the subnets 1 and 3.

Terminals 4 to 16 of the local network may be mobile or fixed communication devices and may, for example, include a station, a connection control device, a radio transceiver including an antenna or the like. A station may, for example, be a portable computer or a telephone.

In the following, the present invention will further be described with reference to a communication network and subnets in accordance with the IEEE 802.11 standard. It has to be noted that in spite of the fact that the present invention is described in the following with reference to communication networks in accordance with the IEEE 802.11 standard, the present invention is not limited to such standards, but may be applied to any packet switched radio communication network having a signaling structure for indicating a doze or power save mode of a terminal.

Figure 2:
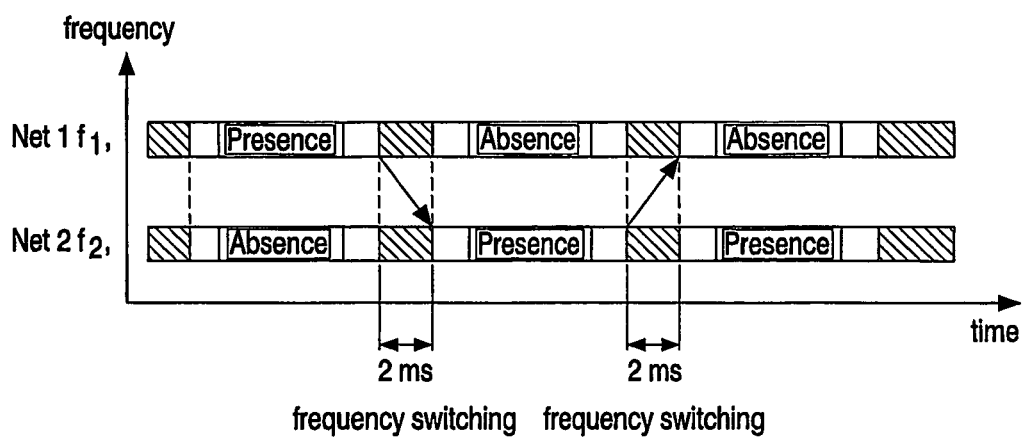
FIG. 2 shows a time-dependency diagram showing the switching between two subnets according to an exemplary embodiment of the present invention.

FIG. 2 shows a time dependency diagram for further explaining the switching of the bridge terminal from one subnet net 1, which is operated at the frequency $f_1$, to another subnet net 2, which is operated at the frequency $f_2$. As may be taken from FIG. 2, the bridge terminal is switched periodically from the subnet net 1 to the subnet net 2 and back to the subnet net 1. During the time the bridge terminal is present in the subnet net 1, it is absent in subnet net 2. During the time the bridge terminal is present in subnet net 2, it is absent in subnet net 1. As also may be taken from FIG. 2, the frequency switching may approximately take 2 milliseconds. During the frequency switching, i.e. during these 2 milliseconds, the bridge circuit is able neither to receive nor to transmit anything.

Figure 3:
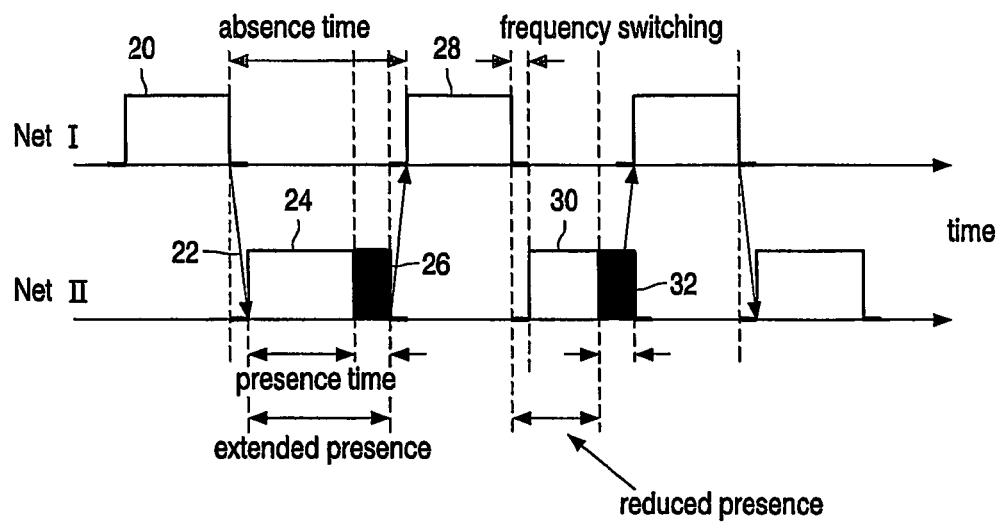
FIG. 3 shows a time dependency diagram showing a time jitter compensation according to an exemplary embodiment of the present invention.

FIG. 3 shows a time dependency diagram for further explaining an extension or reduction of the presence time of the bridge circuit in one of the subnets net 1 and net 2 in accordance with an exemplary embodiment of the present invention. Due to the competition access method for accessing a radio channel, the switching, i.e. the change between the presence and absence of the bridge channel in one subnet cannot be carried out at one precise moment of time.

After the end of pulse 20, the frequency of the radio transmitter of the bridge circuit is switched from the frequency of subnet net 1 to the frequency of subnet net 2. This is indicated by arrow 22. As already indicated with reference to FIG. 2, the switching between the subnets usually takes approximately 2 ms. Then, the subnet is present, i.e. operated in the subnet net 2 as indicated with pulse 24. A comparison of pulse 20 to pulse 24 shows that the pulse 24 is longer than the pulse 20. In this case, due to the competition access method, the presence time of the bridge terminal is extended by an extension 26. Then, the operation of the bridge terminal is switched back to the subnet net 1 where, after the approximately 2 ms of the switching, the bridge terminal is available during a time indicated by a pulse 28. After the end of pulse 28, the bridge circuit is again switched to the operation in the subnet net 2. As may be taken from pulse 30 indicating the presence of the bridge terminal in subnet net 2, the pulse 30 is shorter than the standard pulse 20, indicating the standard presence time of the bridge terminal in the respective subnet. The pulse 30 was reduced by a time 32 indicated in FIG. 3. After the pulse 30, the operation of the bridge terminal is switched back to the operation in the subnet net 1.

A further reason for the extension of the absence time of the bridge terminal in one of the subnets is the internal transmission between stations and collisions between absence time signaling messages. The jitter of the switching strongly depends on the traffic to be transmitted between the subnets.

An extension of the presence time causes a delay of the data transmission. In order to allow for a fair presence time of the bridge terminal in both subnets, it is necessary to set a mean presence time. The mean presence time in the example depicted in FIG. 3 is indicated with pulse 20. As may be taken from FIG. 3, the presence time 30 following an extended presence time 24 is reduced by the amount 32, by which the presence time 34 exceeds the extended presence time 20. Thus, the pulse 32 should have the same dimensions as the pulse 26. According to this principle, after sufficient switching cycles between the two subnets, an average presence time corresponding to the set presence time 20 may be achieved.

Presence and Absence on the Basis of the Energy Saving Modes

Figure 4:
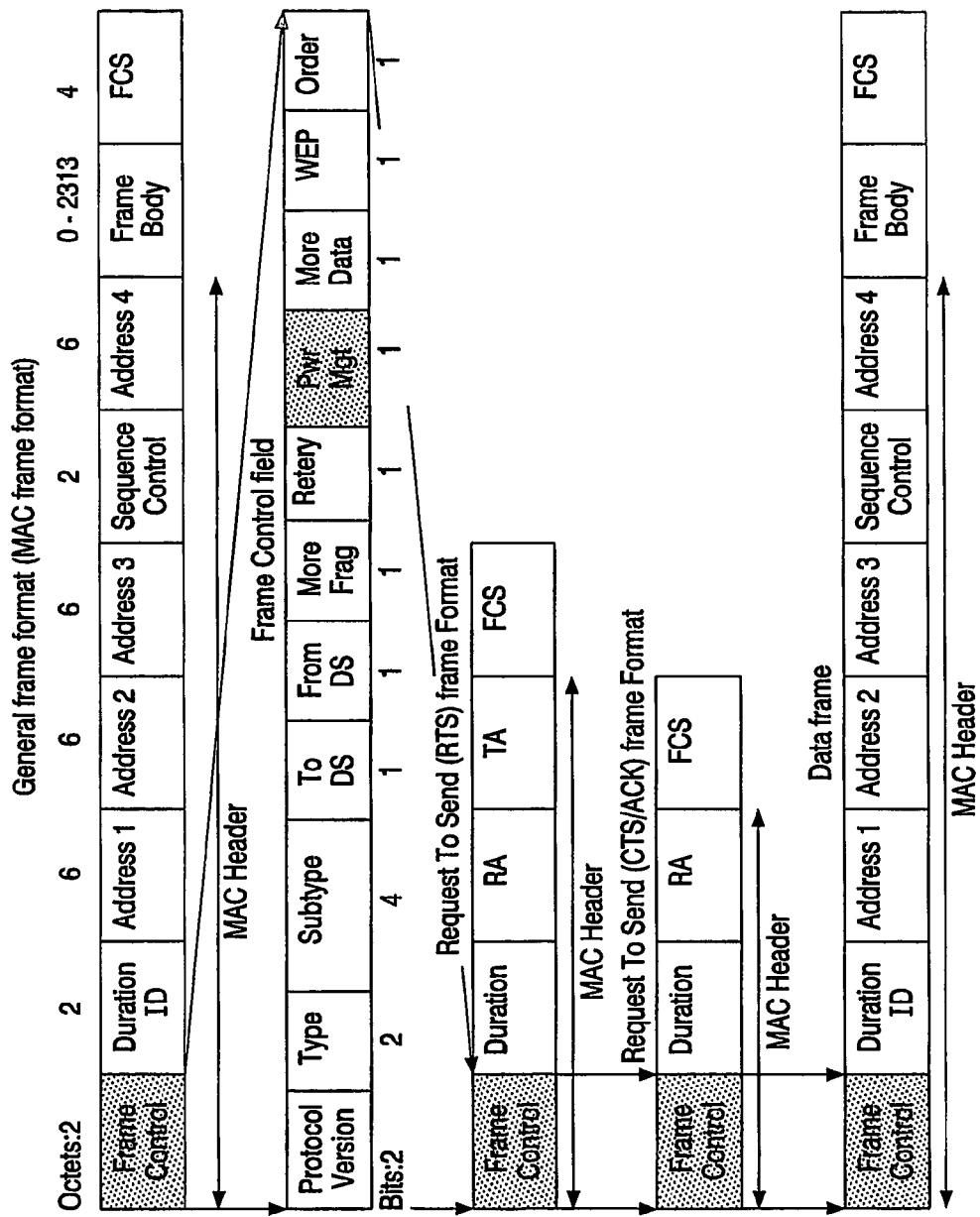
FIG. 4 shows a MAC frame format in accordance with the IEEE 802.11 standard.

In the energy saving mode, a station or terminal may be in one of two states:

1. awake: the station is ready for transmission and/or reception 2. doze: the station/terminal neither sends nor receives The awake state of a station or terminal includes the continuous listening on the radio pulse for a frame for starting a transmission or actualizing the NAV. Due to this, by the reception of one frame, all stations may draw conclusions with respect to the power management state of the transmission or receiving station of the received frame. The IEEE 802.11 standard defines three different categories of frame types: data frames, control frames and management frames. The header of each frame to be transmitted includes a plurality of control and management information, as may be taken from FIG. 4, showing the general frame format in accordance with the IEEE 802.11 standard. A complete description of the information in the header may be taken from the IEEE 802.11 standard, which is hereby incorporated by reference.

Figure 5:
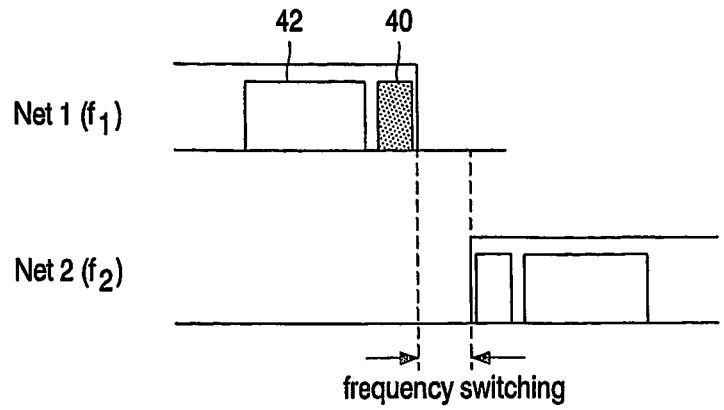
FIG. 5 shows a time dependency diagram showing a signaling of a presence and absence in a subnet in accordance with an exemplary embodiment of the present invention.

FIG. 5 shows a detail of a header for further explaining the principle of the present invention. As depicted in FIG. 5, the indication of the energy saving mode is made by means of a power management bit (PWRMgtBit)-field indicated with reference numeral 40 in FIG. 5. As may be taken from FIG. 5, during a data exchange sequence, including the exchange of data frame 42, a switching from the subnet net 1 to the subnet net 2 may be indicated by the bridge terminal by setting the power management bit 40. After the power management bit 40 has been sent, all other terminals in the subnet net 1 are aware that the bridge terminal is in the doze state, i.e. not available in the subnet net 1. Since all stations continually listen to the radio path, this doze state of the bridge terminal is signaled to all stations/terminals in the subnet net 1. Then, the bridge terminal can be switched to the subnet net 2 and start its operation in the subnet net 2.

The CSMA/CA method, which is the basic access method according to the IEEE 802.11 standard avoids collisions by the use of a priority scheme according to which access rights of respective stations are signaled. In case a station is ready to send, the station listens to the transmission media, i.e. to the radio path and if the path is free, it sends a transmission request. Details with respect to the CSMA/CA are described in the IEEE 802.11 standard, which is hereby incorporated by reference. Due to the CSMA/CA method, the appearance of collisions may be reduced, however, it cannot be completely avoided.

Due to this, the sign-off of the bridge terminal from the remaining stations in the actual subnet cannot always be performed without collisions. A preferable way to signal or broadcast the sign-off is the normal data transmission sequence, including RTS/CTS (ready to send/clear to send) from the bridge terminal to other stations or from other stations to the bridge terminal. This data exchange is protected by the NAV and furthermore includes a confirmation for the received signaling of the following doze mode.

In case the presence time of the bridge circuit ends and there is no planned data transmission, there are two alternatives for signaling the sign-off. The first alternative is to send a broadcast message, which is a transmission from the bridge terminal to all or most of the remaining terminals or stations in the respective subnet. The second alternative is the transmission of a data frame, which is a terminal to terminal transmission. The first alternative, i.e. the broadcast transmission is depicted in FIG. 6 and the data frame transmission, i.e. the second alternative, is depicted in FIG. 7.

Figure 6:
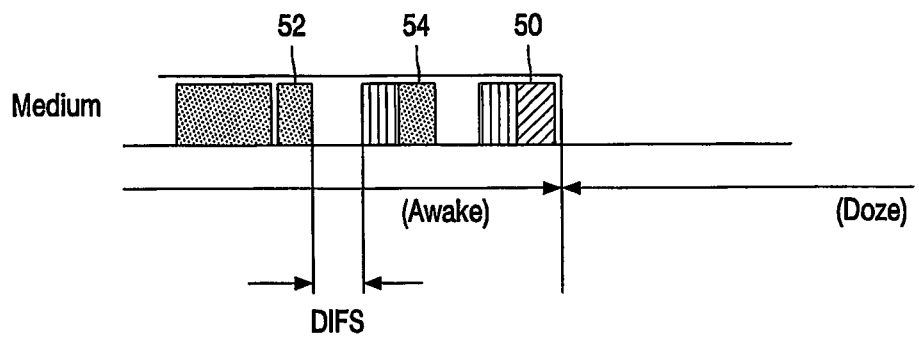
FIG. 6 shows a time dependency diagram of a broadcast for signaling a doze mode in accordance with an exemplary embodiment of the present invention.
Figure 7:
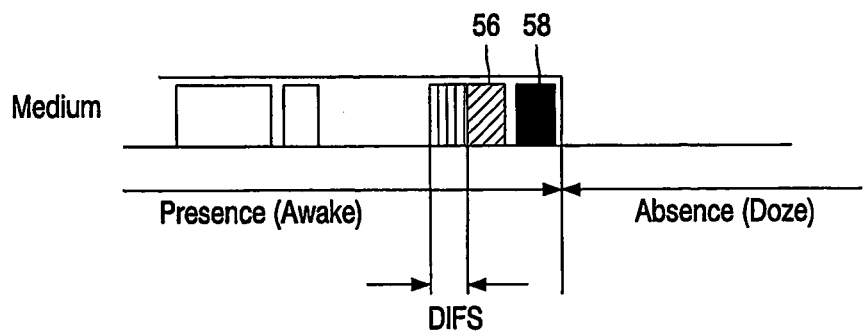
FIG. 7 shows a time dependency diagram of a transmission of a data frame for signaling the doze mode in accordance with an exemplary embodiment of the present invention.

As can be taken from FIG. 6, the bridge terminal is awake until the end of the broadcast transmissions of the frame 50 (the hatched frame). After the end of the transmission of the broadcast of the frame 50 with the power management bit, the bridge terminal has indicated its up-coming doze state to the remaining stations in the subnet. Then, it may be switched to the other subnet.

Such broadcast transmission is a simple and effective way to reach all stations within one subnet, i.e. within one independent basic service set (IBSS). However, a disadvantage of the broadcast appears when there are collisions. There is no confirmation for a broadcast message according to the IEEE 802.11 standard. Due to this, there is no control for the successful delivery of the broadcast message to all of the remaining stations. According to an aspect of the present invention, this can be solved by successively transmitting a plurality of broadcast frames. Thus, for example, the frames 52 and 54 may be broadcast frames with the power management bit. However, even the transmission of a plurality of broadcasts does not allow the confirmation of the successful reception of the broadcasts by all of the terminals within the subnet.

The second alternative is the preferred embodiment. According to this exemplary embodiment of the present invention, a data frame is sent without RTS/CTS by the bridge terminal. According to the IEEE 802.11 standard, the receiving station or terminal confirms the reception of such data frame. Using the transmission of such data frame for indicating the up-coming doze state allows for the confirmation of the successfully received doze mode signaling of the bridge terminal. A missing confirmation according to an aspect of the present invention automatically causes a new sending of this data frame. The content of such data frame may include a dummy entry having a length of 0. This is depicted in FIG. 7. As may be taken from FIG. 7, a frame 56 (indicated with hatching) is sent before the up-coming end of the presence time of the bridge terminal in this subnet. Then, after the other terminal (in this case there is only one other terminal) has sent its acknowledgement frame ACK 58, indicating that it successfully received the frame with the power management bit, the bridge terminal switches to the other subnet. Therefore, from the point of view of the subnet depicted in FIG. 7, after the switching to the other subnet, the bridge terminal is in the doze state.

Synchronization of the Bridge Terminal

Figure 8:
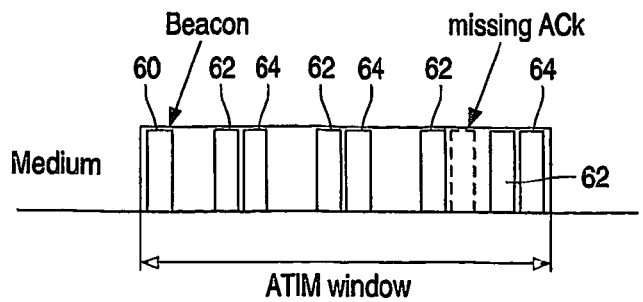
FIG. 8 shows a time dependency diagram of an ad hoc traffic indication message in accordance with an exemplary embodiment of the present invention.

The energy saving mode presumes the synchronization of all stations within one IBSS, i.e. within one subnet. The synchronization itself is carried out by transmitting beacons. These beacons are transmitted at regular time intervals. After the alignment of the time synchronization function (TSF) the remaining transmissions are indicated by means of an ad hoc traffic indication message (ATIM). This is shown in FIG. 8. FIG. 8 shows an ATIM window. At the beginning of the ATIM window, there is the transmission of the beacon 60. Then, the remaining transmissions are each indicated by means of the transmission of an ATIM message 62. The ATIM messages have to be acknowledged by means of an acknowledgment message ACK 64 by the receiving terminal. In FIG. 8, one acknowledgment message is missing. Thus, the respective transmission is repeated.

Stations which are in the doze mode have to change to the awake state for the ATIM window in order to not miss the remaining transmissions from other stations.

The ATIM window and the synchronization is important for the bridge terminal. Since the bridge terminal constantly changes between two or even more subnets, the bridge terminal has to be synchronized in those subnets and has to send acknowledgment messages ACK for each ATIM in each of both subnets. The missing of such an acknowledgment message ACK may have two reasons. The first reason is that the sent ATIM message was not received due to a collisions. The second reason may be that due to a missed synchronization, the receiving station is in the doze mode.

For both cases, the IEEE 802.11 standard provides for a new display of the remaining transmissions in the successive ATIM window. In order to avoid that stations stop the retransmission of data frames after the second repetition of the ATIM window, the bridge terminal according to the present invention is arranged such that it is present in the respective subnets for each second ATIM window.

FIG. 8 shows a time dependency diagram of frequency changes between two subnets and shows the position of the ATIM window. The pulses 70 indicate the presence time of the bridge terminal in the subnet net 1 and the subnet net 2. The pulses 72 indicate the ATIM messages in the subnet net 2 and the pulses 74 indicate the ATIMs in the subnet net 1. The operation of the subnet net 1 is indicated in the upper part of FIG. 9, whereas the operation of the subnet net 2 is indicated in the lower part of FIG. 9. Reference numeral 76 indicates extended presence time of the bridge terminal in one of the subnets net 1 and net 2.

Figure 9:
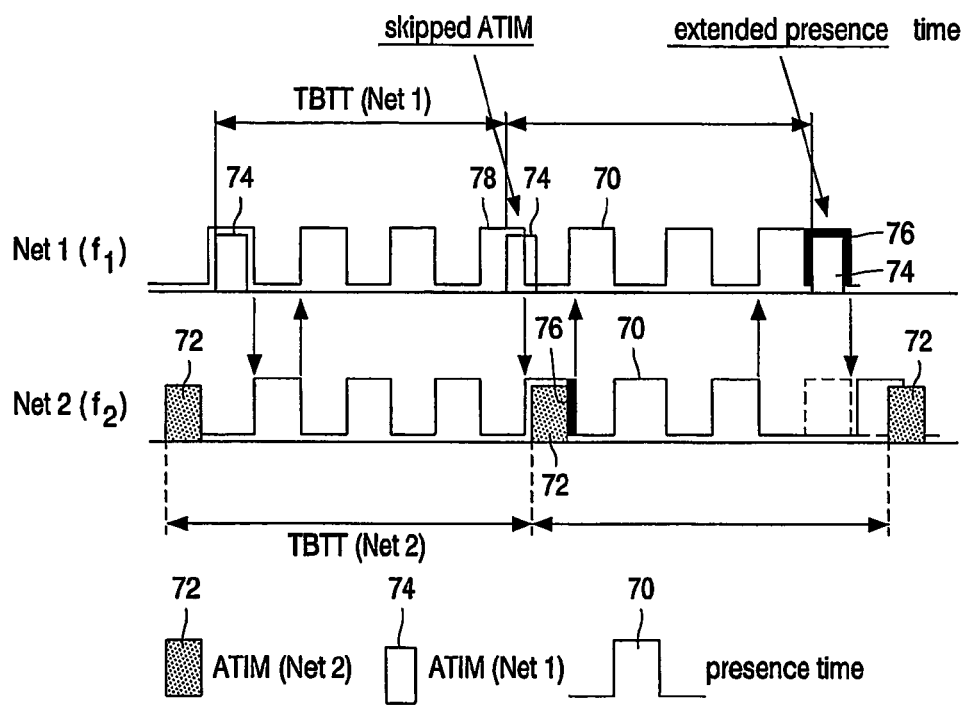
FIG. 9 shows a time dependency diagram showing the effects of ATIM on the frequency switching in accordance with an exemplary embodiment of the present invention.

Due to the variable length of the ATIM period and the target beacon transmission time (TBTT) periods, which can be varied by terminals which are dynamically selected, the different ATIM and TBTT of both nets have to be considered as may be taken from FIG. 9.

In the case that an ATIM window has been missed, or the respective confirmation is missing (as in the case of the ATIM window 74 during the pulse 78), the IEEE 802.11 standard allows that the respective stations or terminals use assumptions from the preceding transmissions in order to assess or determine the presence of a station. Such definition allows the bridge circuit to completely skip an ATIM window as is the case during the pulse 78 indicating the presence time of the bridge circuit in the subnet net 1. However, if an ATIM window has been missed, the confirmation of the sent ATIM is missing. Therefore, until the succeeding beacon, the stations have to make their assumptions with respect to the presence of a station on the basis of frames received up to this point. Due to this knowledge, the stations may initiate data exchange sequences, even during such a transmission phase. However, a permanent omission or missing of ATIM windows or a permanent non-confirmation of ATIM messages may not occur, since other stations, which may also have changed to the doze mode have to be informed about up-coming transmissions from the bridge terminal. Apart from that, it is necessary for the bridge terminal to know when the next beacon will be sent. Due to this, an alignment with the time synchronization functions (TSF) of both subnets may be important for the bridge terminal.

Synchronization Via Probe/Probe Response

After a beacon has been missed, the time synchronization function (TSF) of the bridge circuit may no longer be synchronized to the TSFs of the remaining stations/terminals. Then, the time of the subsequent beacon would no longer be known to the bridge terminal and thus no new synchronization would be possible. In such a case, the IEEE 802.11 standard provides for the probe-P/response mechanism. This mechanism is an active request with respect to the affiliation or membership of a station to a radio cell. During the probe-P/response mechanism, a probe-request message is sent to all stations of the subnet. Then, the station to which the beacon was sent earlier on responds with a probe-response message to the request. The probe-request message includes information such as a time stamp and a beacon interval. These two fields of information offer a new synchronization of the TSF of the bridge terminal.

Figure 10:
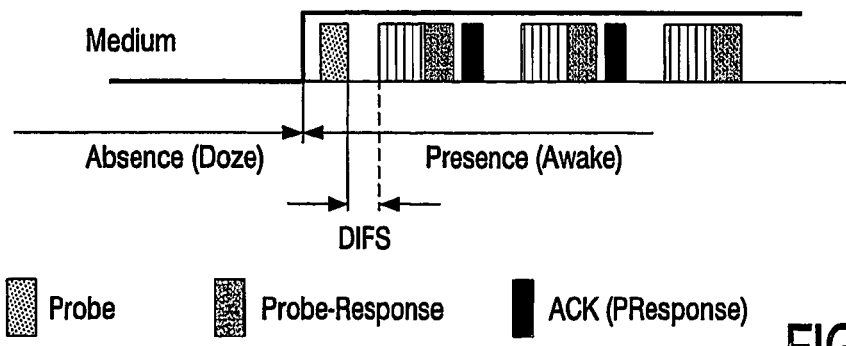
FIG. 10 shows a time dependency diagram showing the use of the probe-response mechanism in accordance with an exemplary embodiment of the present invention.

FIG. 10 shows the use of a probe-P/response message in a frequency switching phase. The use of the probe-response mechanism for the bridge terminal according to the present invention allows for the synchronization of the TSF as well as for the signalization of the absence at the same time.

Figure 11:
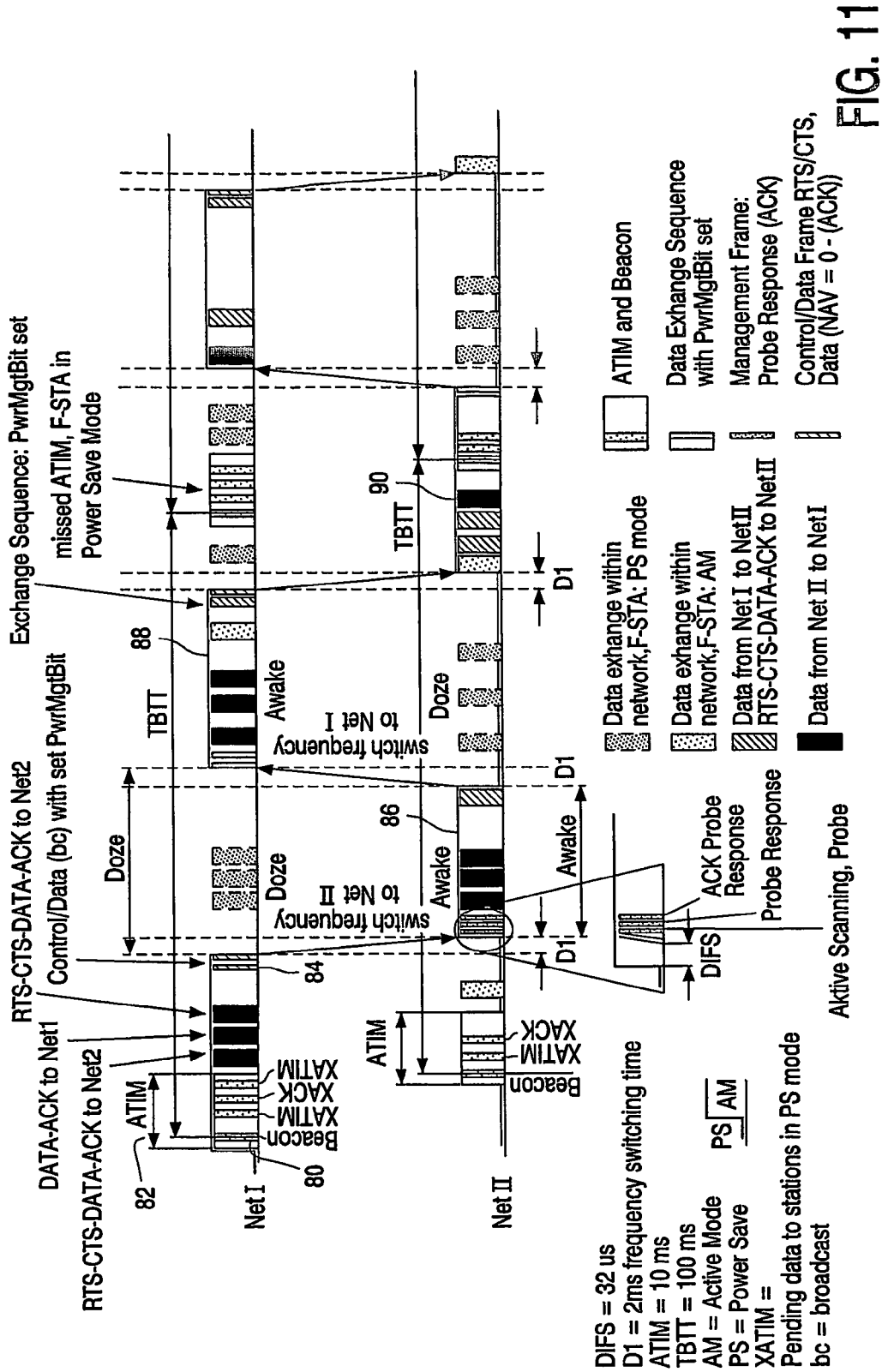
FIG. 11 shows a time dependency diagram of an exemplary embodiment of a method for operating a communication network in accordance with the present invention.

With reference to FIG. 11, the interaction of the individual elements and aspects of the present invention described with reference to FIGS. 1 to 10 above will be described.

As may be taken from FIG. 11, at the beginning, the bridge terminal is operated in subnet net 1. By means of the beacon 80 at the beginning of the TBTT, the bridge terminal is synchronized. For the rest of the ATIM window 82, the bridge terminal is operated in the subnet net 1. After the beginning of the transmission phase, the bridge terminal attempts to indicate its switching to the power save state (doze state) by sending frames 84 including the set power management bit. In case it is necessary to indicate the switching by means of up-coming data transmissions, the bridge terminal transmits the so-called dummy data frames without contents, including the set power management bit. The data frame is addressed to the station which made the last transmission and which is in the awake state. After the reception of the complete confirmation for the sent data frame, the bridge terminal switches the frequency and becomes participant in the subnet net 2. During the presence time in subnet net 2, the bridge terminal is in the doze state or power save mode from the point of view of the terminals in the subnet net 1. Therefore, all stations which have received the dummy data frame in subnet net 1 postpone their transmissions to the bridge terminal.

After the switching time D1, which as already indicated above is usually 2 ms, the bridge terminal listens to the medium, i.e. the radio path for a distributed inter-frame space DIFS. Advantageously, this avoids that a data transmission between other stations is disturbed or that transmissions in an ATIM window are disturbed. When the bridge terminal determines after a DIFS that the transmission medium is not busy, the bridge terminal sends a probe-request message via the active scanning for synchronization of TSF with the subnet net 2. Now, the bridge terminal is fully present in the subnet net 2. During the remaining presence time 86, a normal data transmission to and from other stations may be carried out. At the end of the presence time 86 in subnet net 2, the bridge terminal indicates or signals its change to the power save or doze state in the same way as during the change from the subnet net 1 to the subnet net 2.

When the bridge terminal was switched to its following presence time in subnet net 1, the duration of the TBTT and the ATIM window is known, due to the beacon 80 received during the preceding presence time. Now, the data received in the subnet net 2 during the presence time 86 can be distributed to the respective stations in the subnet net 1. At the same time, the reinstated awake state, i.e. presence, can be indicated to the stations in the subnet net 1. Due to the fact that the other stations, i.e. the stations which do not receive a data transmission from the subnet net 2 listen to the transmission channel, they are informed about the new presence time of the bridge terminal by means of these data transmissions. Accordingly, all stations in the subnet net 2 are now informed about the actual state of the bridge terminal. Accordingly, a confirmation of the ATIMS in the ATIM window is no longer necessary. Advantageously, the active scanning may be omitted here.

As may be taken from FIG. 10, after the presence time 88 in the subnet net 1, the bridge terminal is again switched to the subnet net 2 and has another presence time 90 in the subnet net 2. As can be taken from FIG. 10, after the switching to the subnet net 2 for the presence time 90, a new ATIM window is due in the subnet net 2. The ATIM windows as well as the TBTT of both subnets are asynchronous and have different sizes. While the ATIM window of the subnet net 2 can be received, the timely shifted ATIM window in subnet net 1 is missed. In this case, the remaining stations send an ATIM message to the bridge terminal in subnet net 1 in case there are upcoming transmissions in these stations. This signaling will be repeated until the end of the ATIM window and is ended at the end of the ATIM window. The missing of the ATIM information causes the buffering of the up-coming MSDUs (MAC Service Data Unit) until the next ATIM window. As already indicated with reference to FIG. 3, the presence time in the subnet net 2 is extended by the length of the ATIM window.

The invention claimed is:

1. A method of connecting a first subnet and a second subnet of a communication network by means of a bridge terminal, wherein the first subnet operates on a first frequency channel and the second subnet operates on a second frequency channel, the method comprising:
signaling a switching operation and unavailability of the bridge terminal by sending a power management bit in a header of a data frame to stations in either the first subnet or the second subnet which is not served by the bridge terminal after the switching operation; and
switching the operation of the bridge terminal between an operation in the first subnet on the first frequency channel and an operation in the second subnet on the second frequency channel, wherein the bridge terminal is unavailable for the first subnet when it is operated in the second subnet, and wherein the bridge terminal is unavailable for the second subnet when it is operated in the first subnet.

2. The method of claim 1, wherein the communication network is a packet transmission network in accordance with the IEEE 802.11 standard.

3. The method of claim 2, wherein the operation of the bridge terminal is switched periodically between the first and second subnets such that the bridge terminal is operated in each of the first and second subnets for a predetermined duration; and wherein jitters in the predetermined duration are compensated over a plurality of switching cycles by controlling the switching.

4. The method of claim 1, wherein a content of missed beacon signals is reported by the bridge terminal by means of a probe/probe signaling.

5. The method of claim 1, wherein a presence time of the bridge terminal in each of the subnets is set to a mean presence time, a presence time is equal for both the first subnet and the second subnet, thereby avoiding delays in data transmission.

6. A bridge terminal for connecting a first subnet and a second subnet of a communication network, wherein the first subnet operates on a first frequency channel and the second subnet operates on a second frequency channel, the bridge terminal comprising:
a processor coupled to a memory, the processor configured to switch between an operation in the first subnet on the first frequency channel and an operation in the second subnet on the second frequency channel, wherein the bridge terminal is unavailable for the first subnet when operated in the second subnet, wherein the bridge terminal is unavailable for the second subnet when operated in the first subnet, and
a transmitter configured to signal the switching operation and the unavailability of the bridge terminal by to sending a power management bit in a header of a data frame to stations in either the first subnet or the second subnet which is not served by the bridge terminal after the switching operation.

7. The bridge terminal of claim 6, wherein the communication network is a packet transmission network in accordance with the IEEE 802.11 standard.

8. The bridge terminal of claim 6, wherein the operation of the bridge terminal is switched periodically between the first and second subnets such that the bridge terminal is operated in each of the first and second subnets for a predetermined duration; and wherein jitters in the predetermined duration are compensated over a plurality of switching cycles by controlling the switching.

9. The bridge terminal of claim 6, wherein a content of missed beacon signals is reported by the bridge terminal by means of a probe/probe signaling.

10. The bridge terminal of claim 6, wherein a presence time of the bridge terminal in each of the subnets is set to a mean presence time, a presence time is equal for both the first subnet and the second subnet, thereby avoiding delays in data transmission.

11. A communication network comprising:
a first subnet;
a second subnet; and
a bridge terminal for connecting the first and second subnets, wherein the first subnet operates on a first frequency channel and the second subnet operates on a second frequency channel, wherein an operation of the bridge terminal is switched between an operation in the first subnet on the first frequency channel and an operation in the second subnet on the second frequency channel, wherein the bridge terminal is unavailable for the first subnet when it is operated in the second subnet, wherein the bridge terminal is unavailable for the second subnet when it is operated in the first subnet, wherein the switching operation and the unavailability of the bridge terminal is signaled by sending a power management bit in a header of a data frame to stations in either the first subnet or the second subnet which is not served by the bridge terminal after the switching operation.

12. The communication network of claim 11, wherein the communication network is a packet transmission network in accordance with the IEEE 802.11 standard.

13. The communication network of claim 11, wherein a presence time of the bridge terminal in each of the subnets is set to a mean presence time, a presence time is equal for both the first subnet and the second subnet, thereby avoiding delays in data transmission.

14. A non-transitory machine readable medium having stored thereon machine executable instructions that, when executed, implement a method for operating a bridge terminal of a communication network for connecting a first subnet and a second subnet, wherein the first subnet operates on a first frequency channel and the second subnet operates on a second frequency channel, wherein, when the instructions are executed on the bridge terminal, the instructions cause the bridge terminal to perform:
signaling a switching operation and unavailability of the bridge terminal by sending a power management bit in a header of a data frame to stations in either the first subnet or the second subnet which is not served by the bridge terminal after the switching operation; and
switching an operation of the bridge terminal between an operation in the first subnet on the first frequency channel and an operation in the second subnet on the second frequency channel, wherein the bridge terminal is unavailable for the first subnet when it is operated in the second subnet, wherein the bridge terminal is unavailable for the second subnet when it is operated in the first subnet.

15. The non-transitory machine readable medium of claim 14, wherein a presence time of the bridge terminal in each of the subnets is set to a mean presence time, a presence time is equal for both the first subnet and the second subnet, thereby avoiding delays in data transmission.

* * * * *